United States Patent [19]

Salmon

[11] Patent Number: 5,570,189
[45] Date of Patent: Oct. 29, 1996

[54] SPLIT-FIELD PUPIL PLANE DETERMINATION APPARATUS

[75] Inventor: Joseph T. Salmon, Livermore, Calif.

[73] Assignee: The United States of America as represented by the United States Department of Energy, Washington, D.C.

[21] Appl. No.: 453,404

[22] Filed: May 30, 1995

Related U.S. Application Data

[63] Continuation of Ser. No. 967,462, Oct. 28, 1992, abandoned.

[51] Int. Cl.[6] ................................................ G01B 11/26
[52] U.S. Cl. ...................... 356/399; 356/138; 356/150; 356/153
[58] Field of Search ........................... 356/399–401, 356/138–151, 152–155, 381, 152.1–152.3, 139.01–141.5; 250/559.3, 559.37

[56] References Cited

U.S. PATENT DOCUMENTS

| | | | |
|---|---|---|---|
| 3,574,467 | 4/1971 | Paine et al. | 356/153 |
| 3,637,312 | 1/1972 | Cantor et al. | 356/152 |
| 3,836,258 | 9/1974 | Courten et al. | 356/150 |
| 4,238,157 | 12/1980 | Strauch et al. | 356/381 |

*Primary Examiner*—K. Hantis
*Attorney, Agent, or Firm*—Miguel A. Valdes; William C. Daubenspeck; William R. Moser

[57] ABSTRACT

A split-field pupil plane determination apparatus (10) having a wedge assembly (16) with a first glass wedge (18) and a second glass wedge (20) positioned to divide a laser beam (12) into a first laser beam half (22) and a second laser beam half (24) which diverge away from the wedge assembly (16). A wire mask (26) is positioned immediately after the wedge assembly (16) in the path of the laser beam halves (22, 24) such that a shadow thereof is cast as a first shadow half (30) and a second shadow half (32) at the input to a relay telescope (14). The relay telescope (14) causes the laser beam halves (22, 24) to converge such that the first shadow half (30) of the wire mask (26) is aligned with the second shadow half (32) at any subsequent pupil plane (34).

6 Claims, 1 Drawing Sheet

SPLIT-FIELD PUPIL PLANE DETERMINATION APPARATUS

This is a continuation of application Ser. No. 07/967,462 filed Oct. 28, 1992, abandoned.

BACKGROUND OF THE INVENTION

The invention described herein arose in the course of, or under, contract No. W-7405-ENG-48 between the United States Department of Energy and the University of California for the operation of Lawrence Livermore National Laboratory.

The present invention relates generally to optical components for use in conjunction with lasers, and more particularly to an improved means for aligning laser relay optics.

During assembly and alignment of relay optics for a laser optical transport system, proper relay of the input (such as a mask) throughout the system is a primary objective, since this arrangement keeps the beam in the near field and, thus, avoids diffraction effects where the beam is used. Current means of achieving this goal include using outputs from a commercially available optical ray tracing software package and/or the use of various masks, such as the corners of cards or wires, placed in the beam at intermediate pupil planes, the pupil planes being planes intersecting the laser beam where the input pupil is imaged. In addition, a little luck and a great deal of patience is required to achieve proper alignment. The quality of alignment eventually obtained is limited by patience and eye strain and is, at the best, a subjective decision.

Clearly, it would be advantageous to have a more precise means for aligning a laser optical relay system. However, to date practitioners have suffered the tedious and imprecise method and means heretofore described, there being no available remedy to make the task either easier or better accomplished.

Split-field imagers are known in the art, and have been used in a variety of applications, as in rangefinder devices, including those found in cameras. However, to the inventor's knowledge, no prior art split-field imaging devices have been adaptable for use in aligning laser relay optics, and all prior art split-field imaging configurations have been inappropriate for this purpose.

No method or means for aligning laser relay optics, to the inventors' knowledge, has successfully provided an effective means for alignment which did not require a subjective assessment of alignment on the part of the user. Furthermore, no prior art means for aligning laser relay optics known to the inventor has provided an indication of the direction in which the optical components are misaligned. All prior art laser relay optics alignment methods have required the user to visually align the slit through the transport optics with, at best, some crude alignment reference placed in the beam path.

SUMMARY OF THE INVENTION

Accordingly, it is an object of the present invention to provide a method and means for alignment of laser relay optics that provides an objective indication of alignment.

It is another object of the present invention to provide a method and means for alignment of laser relay optics which is easy to use.

It is still another object of the present invention to provide a method and means for alignment of laser relay optics which is adaptable to a variety of laser transport arrangements.

It is yet another object of the present invention to provide a method and means for alignment of laser relay optics which provides a high degree of repeatability of alignment.

It is still another object of the present invention to provide a method and means for alignment of laser relay optics which will accurately align a pupil through the relay optics.

It is yet another object of the present invention to provide a method and means for alignment of laser relay optics which is simple in construction and inexpensive to produce.

It is still another object of the present invention to provide a method and means for alignment of laser relay optics which provides an indication of the direction in which the optics are presently misaligned.

Briefly, the preferred embodiment of the present invention is a split-field type optical apparatus having a pair of opposed optical wedges which intersect the laser beam such that one half of the beam is deflected upward by one of the wedges while the other half of the beam is deflected downward by the other. A wire reference mask is inserted in the path of the laser beam immediately after the wedges and the shadow thereof is caused to diverge with the two halves of the laser beam. When the laser beam is then transmitted through subsequent optics, the split shadow of the wire reference will converge and align at all subsequent image planes.

An advantage of the present invention is that subjective analysis of laser relay optics alignment is eliminated, or at least substantially reduced.

A further advantage of the present invention is the alignment of laser relay optics is made easier and less tedious.

Yet another advantage of the present invention is that the repeatability of alignment of laser relay optics is increased.

Still another advantage of the present invention is that, when the optical components are misaligned, there is an indication of the direction of movement needed to bring them into alignment.

These and other objects and advantages of the present invention will become clear to those skilled in the art in view of the description of the best presently known mode of carrying out the invention and the industrial applicability of the preferred embodiment, as described herein and as illustrated in the drawing.

DETAILED DESCRIPTION OF THE INVENTION

Figure 1:
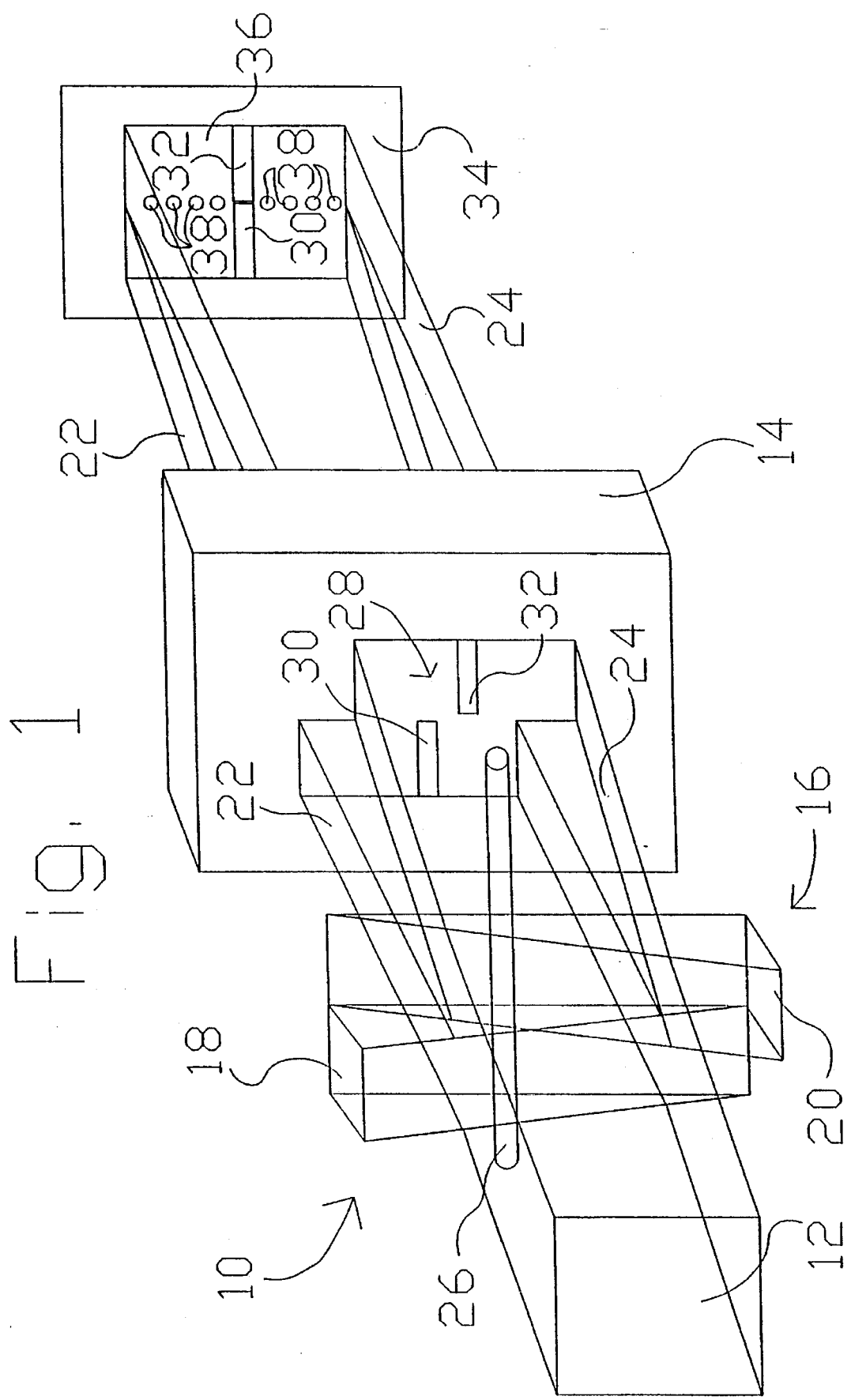
FIG. 1 is a perspective diagrammatic view of a pupil plane determination apparatus according to the present invention.

The best presently known mode for carrying out the invention is a split-field pupil plane determination apparatus. The predominant expected usage of the split-field pupil plane determination apparatus of the present invention is for the alignment of laser relay optics, particularly that used in conjunction with master oscillator power amplifier ("MAPA") chains.

A split-field pupil plane apparatus is shown in a diagrammatic perspective view in FIG. 1, and is designated therein by the general reference character 10. In the best presently known embodiment 10 of the present invention, a laser beam 12 is directed toward a (typically afocal) relay telescope 14, the relay telescope 14 being a conventional optical component to be used in conjunction with the laser beam 12 in the application described herein and serving as an image relay means therefor. According to the method of the best presently known embodiment 10 of the present invention, a wedge assembly 16 is inserted in the path of the laser beam 12 immediately before the entrance pupil of the relay telescope 14. The wedge assembly 16 has a first glass wedge 18 and a second glass wedge 20. The first glass wedge 18 and the second glass wedge 20 are oriented with respect to the laser beam 12 such that the laser beam 12 is split vertically with a first laser beam half 22 of the laser beam being deflected slightly upward by the first glass wedge 18 and a second laser beam half 24 of the laser beam 20 being deflected slightly downward by the second glass wedge 20. The angles at which the laser beam halves 22 and 24 are deflected depends on the angular form of the glass wedges 18 and 20 and, to a lesser degree, on the optical properties of the materials of which the glass wedges 18 and 20 are fabricated. In the best presently known embodiment 1O of the present invention, the first glass wedge 18 and the second glass wedge 20 are alike to each other, and are positioned so as to be coplanar in the path of the laser beam12.

In accordance with the best presently known embodiment 10 of the present invention, a wire mask 26 is inserted in the path of the laser beam halves 22 and 24 at the entrance pupil immediately after the wedge assembly 16 (the entrance pupil being defined in the best presently known embodiment 10 of the present invention by the location of the wire mask 26. The wire mask 26 casts a shadow 28 on the input to the relay telescope 14 which shadow 28 has a first shadow half 30 and a second shadow half 32, the first shadow half 30 being that produced by the first laser beam half 22 and the second shadow half 32 being produced by the second laser beam half 24. As can be seen in the view of FIG. 1, since the first laser beam half 22 and the second laser beam half 24 increasingly diverge as they travel away from the wedge assembly 16, the first shadow half 30 and the second shadow half 32 are misaligned with respect to each other at the input to the relay telescope 14. In accordance with the best presently known embodiment 10 of the present invention, the conventional relay telescope 14 will alter the paths of the first laser beam half 22 and the second laser beam half 24 to cause the first shadow half 30 and the second shadow half 32 to reconverge at a next subsequent pupil plane 34, as can be seen in the view of FIG. 1. This can be used to determine the location of the pupil plane 34 or, alternatively, to relocate other components such that the pupil plane is located at a desired position. A card 36 may be inserted in the path of the laser beam halves 22 and 24 such that the first shadow half 30 and the second shadow half 32 can be seen on the card 36. Further consideration will be given to the operation and specific application of the inventive split-field pupil plane determination apparatus 10, hereinafter, in relation to the industrial applicability of the invention.

It should be noted that supporting devices for holding and moving the wedge assembly 16, the wire mask 26, and other components of the best presently known embodiment 10 of the present invention are conventional in nature and have been omitted from the view of FIG. 1 for the sake of clarity.

Various modifications may be made to the invention without altering its value or scope. For example, the wedge assembly 16 could bisect the laser beam 12 horizontally, or a mask having a slit (not shown) therein could be used, instead of the wire mask 26 described herein. Another obvious variation would be to provide a mask having several indicator lines (not shown), instead of the single reference of the wire mask 26, as an aid to determining how far card 36 is away from the pupil plane 34.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The split-field pupil plane determination apparatus 10 is intended to replace conventional methods and means for determining the pupil plane location in the alignment of laser relay optics.

In many applications a fixed "reader" such as a video camera, is used to view the alignment path through a partially reflective mirror. By this means the shadow halves 30 and 32 can be seen on the card 36 to determine if the card 36 is in a plane before, after or congruent with the pupil plane. The operator can make a determination of the alignment of the shadow halves 30 and 32 by eye or, alternatively, it is anticipated that electronic detection means may be used to further enhance the accuracy and usability of the inventive split-field pupil plane determination apparatus 10.

The inventor has found that a conservative estimate of accuracy to which the alignment of the shadow halves 30 and 32 can be determined by eye is to within 1/10th of the wire diameter. Using this approximation, the sensitivity (E) of the inventive split-field pupil plane determination apparatus 10 is given by the equation:

$$E = \frac{M d}{20 (n-1) \Theta}$$

Where M is the magnification of the relay telescope 14, d is the thickness of the wire mask 26, n is the index of refraction of the glass from which the wedges 18 and 20 are composed and $\Theta$ is the wedge angle of the wedges 18 and 20. The wedge angle of the wedges 18 and 20 is optimized by choosing the maximum angle that results in no more than 25% of the laser beam halves 22 and 24 being clipped on the aperture stop (the limiting aperture) of the system. This much clipping does not affect the operation of the inventive split-field pupil plane determination apparatus 10, since the information from the wire mask 26 is largely confined to the central area of the laser beam halves 22 and 24.

The present inventive split-field pupil plane determination apparatus 10 has been used successfully in conjunction with existing dye laser devices, and the inventor has found that the expected sensitivity has been easily attainable. It should be noted that, in use, a plurality of interference fringes 38 are also produced and are visible on the card 36. The interference fringes 38 are caused by the nearly quadratic curvature in the wave front at the edges of the beam halves 22 and 24 and away from the pupil plane 34. Indeed, the interference fringes 38 could, themselves, be used as alignment aids, but the definition of the interference fringes 38 is not as precise as that of the shadow halves 30 and 32, and so the degree of precision attainable by their alignment would be far less than optimal. Nevertheless, the interference fringes 38 can serve as a coarse reference when the position of the card 36 is far enough away from the pupil plane 34 such that the shadow halves 30 and 32 are projected outside the boundaries of the card 36.

It should be noted that, although the example of the best presently known embodiment 10 of the present invention has been that presently in use in a master oscillator power amplifier dye chain and in a launch telescope application with a dye laser, the invention is potentially applicable to any optical relay system. Although the present example illustrates only one pupil plane 34, one skilled in the art will recognize that there may be several additional relevant pupil planes (not shown) in a dye laser chain. In accordance with the present invention, the shadow halves 30 and 32 will converge at each such additional pupil plane and alignment can be achieved as described herein. In addition, a second wedge assembly 16 could be inserted to split the laser beam 12 along its short axis, or the existing wedge assembly 16 could be rotated, thereby revealing differences in the positions of the pupil planes for each axis caused by astigmatism in the relay telescopes.

It is anticipated that using the inventive split-field pupil plane determination apparatus 10, as described herein, can lead to experiments that may determine the best locations of the pupil planes with respect to the optimization of other laser components.

The inventive split-field pupil plane determination apparatus 10 has greatly simplified the alignment of the entire optical transport system for tunable lasers by eliminating ambiguities in finding the pupil planes of the system. Therefore, it is expected that it will be acceptable in the field as a substitute for the conventional optical relay alignment means. For these and other reasons, it is expected that the utility and industrial applicability of the invention will be both significant in scope and long-lasting in duration.

I claim:

1. Apparatus for locating a pupil plane following relay telescope optics along an optical path comprising:

a pair of optical wedges disposed side-by-side on said optical path for splitting an incident beam of collimated light on said optical path to provide two parallel side-by-side beams of collimated light on said optical path, said parallel side-by-side beams of collimated light being provided such that they diverge while being parallel to the path of the incident beam of collimated light;

a mask disposed to provide a reference shadow having an initial configuration, said mask being disposed so that the reference shadow is split between the diverging parallel side-by side collimated beams to provide a section of said reference shadow in each diverging parallel side-by-side collimated light beam;

said relay telescope optics receiving said diverging parallel side-by-side collimated light beams and coupling said received collimated light beams along the optical path, said relay telescope optics further outputting said diverging parallel side-by-side collimated light beams as converging parallel side-by-side collimated light beams toward said pupil plane;

means for determining a location where said sections of the reference shadow are aligned in said converging parallel side-by side collimated light beams along said optical path, said pupil plane being located where said sections of the reference shadow are aligned to provide a recombined reference shadow having a configuration similar to the initial configuration of the reference shadow.

2. Apparatus as recited in claim 1 wherein said mask provides a shadow normal to the optical path and across said side-by-side collimated light beams.

3. Apparatus as recited in claim 2 wherein said mask is a wire disposed across said side-by-side collimated light beams.

4. Apparatus as recited in claim 1 wherein said mask includes at least one wire disposed across said side-by-side collimated light beams.

5. Apparatus as recited in claim 1 wherein said collimated beam of light is a laser beam.

6. Apparatus as recited in claim 5 wherein said mask includes at least one wire disposed across said side-by-side collimated light beams.

\* \* \* \* \*